United States Patent [19]

Matheny et al.

[11] Patent Number: 4,884,068
[45] Date of Patent: Nov. 28, 1989

[54] MULTIPLE DISPLAY SYSTEM

[76] Inventors: Stephen E. Matheny, 1049 Willow Grove, Altamonte Springs, Fla. 32701; Gary W. Orwig, 2216 Conifer Ave., Winter Park, Fla. 32792

[21] Appl. No.: 906,801

[22] Filed: Sep. 12, 1986

[51] Int. Cl.⁴ .............................................. G09G 1/00
[52] U.S. Cl. ................................... 340/707; 340/710; 340/712; 340/717
[58] Field of Search ............... 340/706, 525, 709, 707, 340/712, 708, 717, 716, 710; 178/18

[56] References Cited

U.S. PATENT DOCUMENTS

| 3,882,446 | 5/1975 | Brittian et al. | 340/706 |
| 4,001,807 | 1/1977 | Dallimonti | 340/525 |
| 4,126,851 | 11/1978 | Okor | 340/706 |
| 4,202,041 | 5/1980 | Kaplow et al. | 340/365 VL |
| 4,419,661 | 12/1983 | Hetsugi | 340/717 |
| 4,661,810 | 4/1987 | Himelstein et al. | 340/706 |
| 4,695,966 | 9/1987 | Takakura et al. | 340/717 |

FOREIGN PATENT DOCUMENTS

| 0114713 | 4/1984 | European Pat. Off. | 340/716 |
| 0056240 | 4/1980 | Japan | 340/717 |
| 0146981 | 9/1983 | Japan | 340/706 |
| 0207142 | 12/1983 | Japan | 340/706 |
| 0231643 | 12/1984 | Japan | 340/717 |

OTHER PUBLICATIONS

"Logistics Spectrum", Journal of the Society of Logistics Engineers-Spring, 1986, pp. 23-27, by Donald McCuish.

Primary Examiner—David K. Moore
Assistant Examiner—M. Fatahiyar
Attorney, Agent, or Firm—William M. Hobby, III

[57] ABSTRACT

A multiple display system having a single light pen made to operate with a plurality of synchronized monitors in an array. A determination of which monitor in the array the light pen is being used with, is made to allow simultaneous usage of the light pen on any of the monitors in the array. Other positioning or pointing input devices can be arranged to work with the array of monitors.

12 Claims, 3 Drawing Sheets

SAMPLE 4 X 4 DISPLAY ARRAY

MULTIPLE DISPLAY SYSTEM

BACKGROUND OF THE INVENTION

The present invention is for a multiple display monitor system in which a single pointing device, such as a light pen, mouse, track ball or joy stick is operable on an array of monitors.

This invention stems from work done on a Parts Management System that required a hardware configuration that interfaced a videodisc player under interactive control of a microcomputer and made use of dual display monitors. The systems primary functioning was controlled by the system's operators use of a light pen to "point" to images, portions of images, icons and text phrases displayed on the monitors. The most desirable approach to using the light pen with the system's dual monitors was to have a single light pen operable on both display devices. The arrangement of hardware and software to effect the functioning of the light pen on both monitors was not available or known and was discovered for this system application.

Prior art Patents which utilized light pens can be seen in the Monteath, et al., U.S. Pat. No. 4,329,684 and in the Brown, et al., U.S. Pat. No. 3,786,479. The Monteath Patent specifically adapted to read bar codes as well as display data, while the Brown Patent is a video display system using a light pen in connection with a graphics generator for converting coded information to analogue, stroke or painted display information. In the Holland U.S. Pat. No. 4,535,403, a signal generator is used for interfacing digital computers to a plurality of peripheral devices, while in the Patent to Shimizu U.S. Pat. No. 4,544,956 shows an image information registering and retrieval system. The Kato U.S. Pat. No. 4,574,395 shows a picture image filing apparatus for storing images in a file management memory and selecting the image signals therefrom. In the Spring 1986 issue of Logistics Spectrum, the Journal of the Society of Logistics Engineers, Volume 20, Issue 1, Pages 23 through 27, a precursor to the present system and describes the command console of the interactive videodisc logistic support system having a computer data subsystem and an interactive videodisc subsystem.

SUMMARY OF THE INVENTION

A multiple display system is illustrated which utilizes a microcomputer having a mother board therein and a plurality of expansion slots on the mother board, and having a keyboard connected thereto. A plurality of display cards are attached to the mother board and each display card is attached to a display for operation by the display card. Each display can be a CRT monitor. A synchronization generator card is attached to the microcomputer mother board and is interfaced to each of the display cards for synchronizing the operation of the display cards and the monitors relative to each other.

A pointer device is attached to the microcomputer for controlling the operation of all the monitors by pointing to an area or point on any one of the monitors. The preferred embodiment has a light pen connected through the display cards for operation with any of the plurality of monitors to operate all of the monitors simultaneously, but can alternatively be a mouse connected to a mouse interface card or a track ball or joy stick. An optical disk and or a magnetic disk can be connected through a disk controller to the mother board of the computer and a videodisc player can be connected to the synchronization generator card of the type manufactured by Video Associates Labs.

Flow diagrams show the software control for both the light pen and mouse or other pointer device. A frame buffer/digitizer board may be used to encode and decode picture information that may then be displayed on the monitors.

DESCRIPTION OF THE DRAWINGS

Other objects, features and advantages of the present invention will be apparent from the written description and the drawings in which.

DESCRIPTION OF THE PREFERRED EMBODIMENTS

Figure 1:
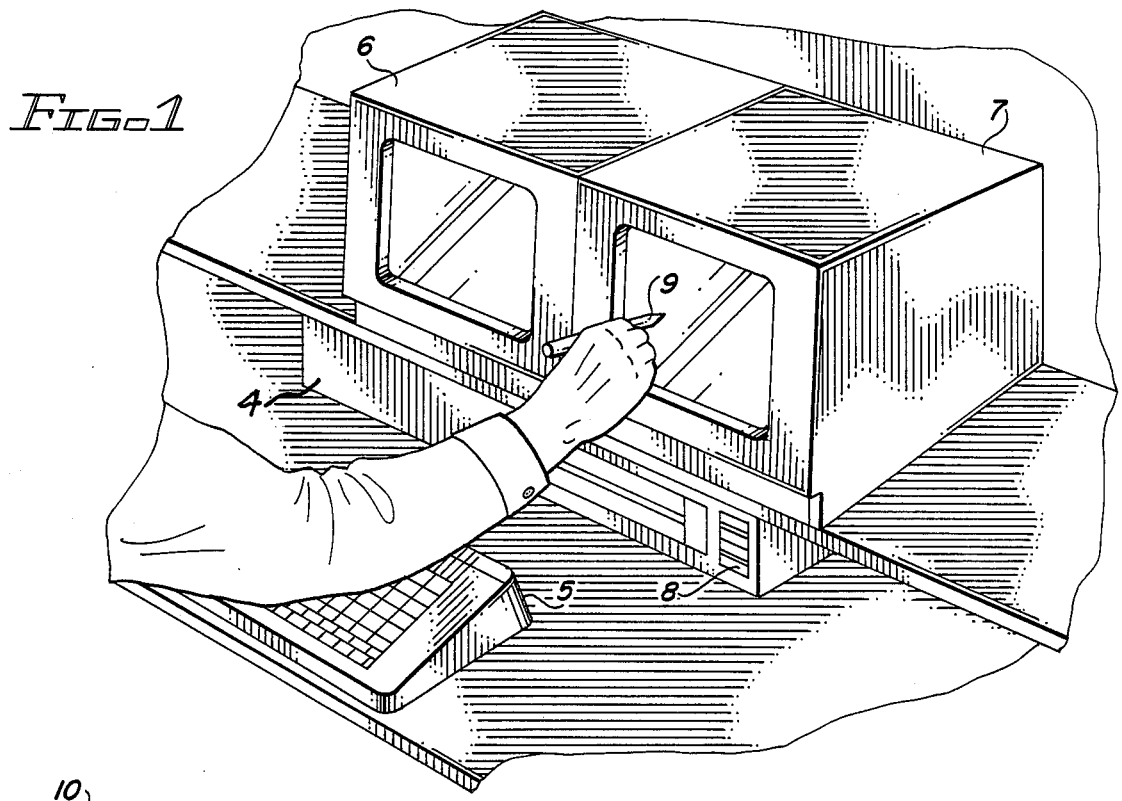
FIG. 1 is a perspective view of a dual monitor computer system in accordance with the present invention.

Referring to FIG. 1, a videodisc player 8, a standard IBM microcomputer or IBM clone 4 has a keyboard 5 and pair of display monitors 6 and 7 being operated with a light pen 9. The light pen 9 will operate on either monitors 6 and 7 any time. The light pen can be moved from one monitor to the other at will, to select or indicate different points on the monitors.

Figure 2:
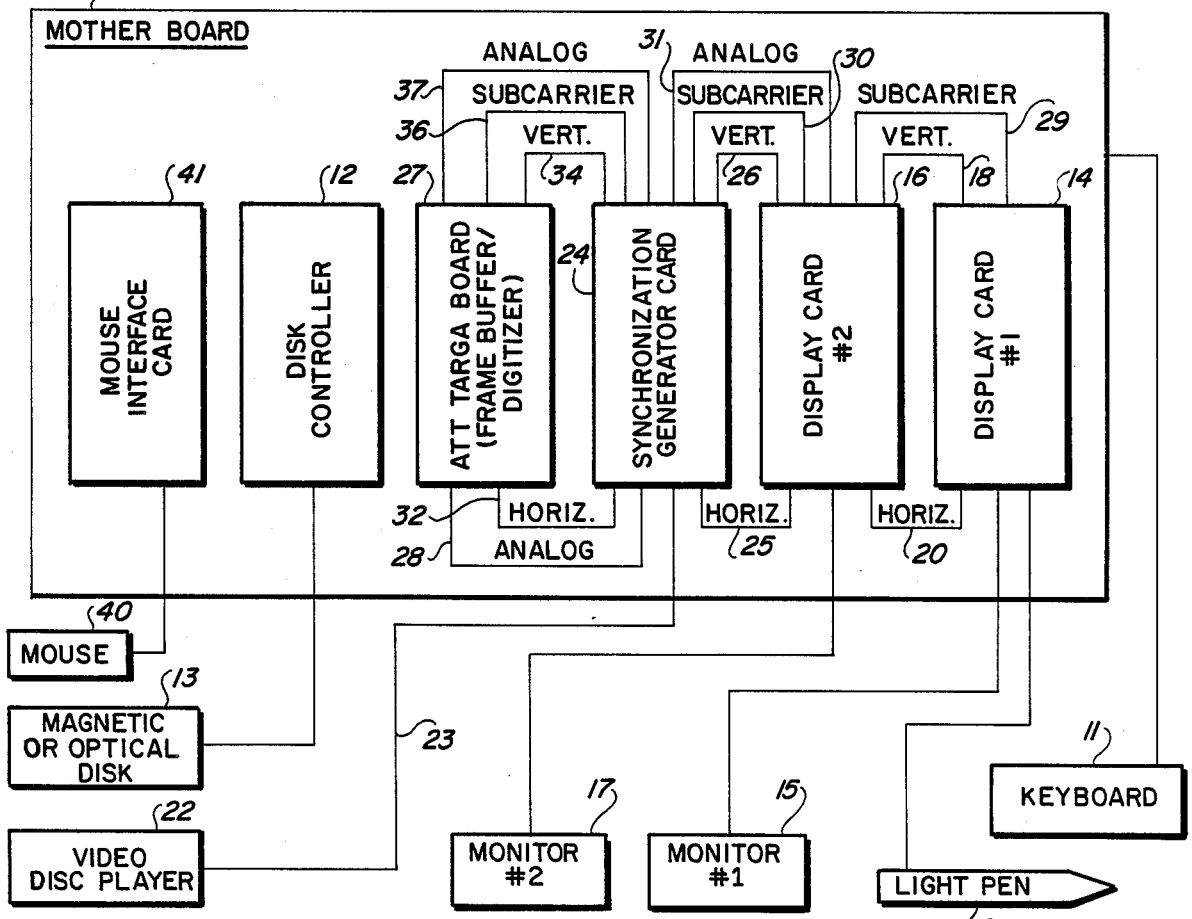
FIG. 2 is a block diagram of the hardware of the system in accordance with FIG. 1.

FIG. 2 shows the internal hardware configuration of the system having a mother board 10, connected to a standard keyboard 11 connected and having multiple expansion slots located therein. The slots, or bus connections, provide connections to a disk controller 12 which may be connected to magnetic or optical storage devices 13. A first display card 14 is connected to a first monitor 15 and a second display card 16 is connected to a second monitor 17. The first and second display cards 14 and 16 are connected by line 18 for vertical control and by line 20 for horizontal control and by line 29 for subcarrier. The display board 14 has a light pen 21 connected therethrough. The system may also have a mouse 40 or similar pointing device connected to the computer's bus with an interface card 41 or through a computer communication port. The optical videodisc 22 is used to store analog images and possibly other digitized information if desired. The videodisc player or other video input device is connected through line 23 to a synchronization generator board 24 which is connected by line 25 to the display card 16 for horizontal control and through line 26 to display board 16 for vertical control, and by line 30 for subcarrier, and by line 31 for analog image information. The display board 14 is connected to display board 16 by line 20 for horizontal control and through line 18 for vertical control and through line 29 for subcarrier. Also interfaced on the mother board 10 bus is an AT&T Targa board 27 (frame buffer card with digitizer) which is connected by line 28 to synchronizing card 24 for analog picture signals. The frame buffer card 27 is connected by line 32 for horizontal control and by line 34 for vertical control and by line 36 for subcarrier control and by line 37 for analog image information.

The operator of the system as illustrated in FIG. 1 operates the system using the light pen on the two display monitors 6 and 7. The two display monitors of the example are used to illustrate an example array of a plurality of two or more monitors.

Figure 3:
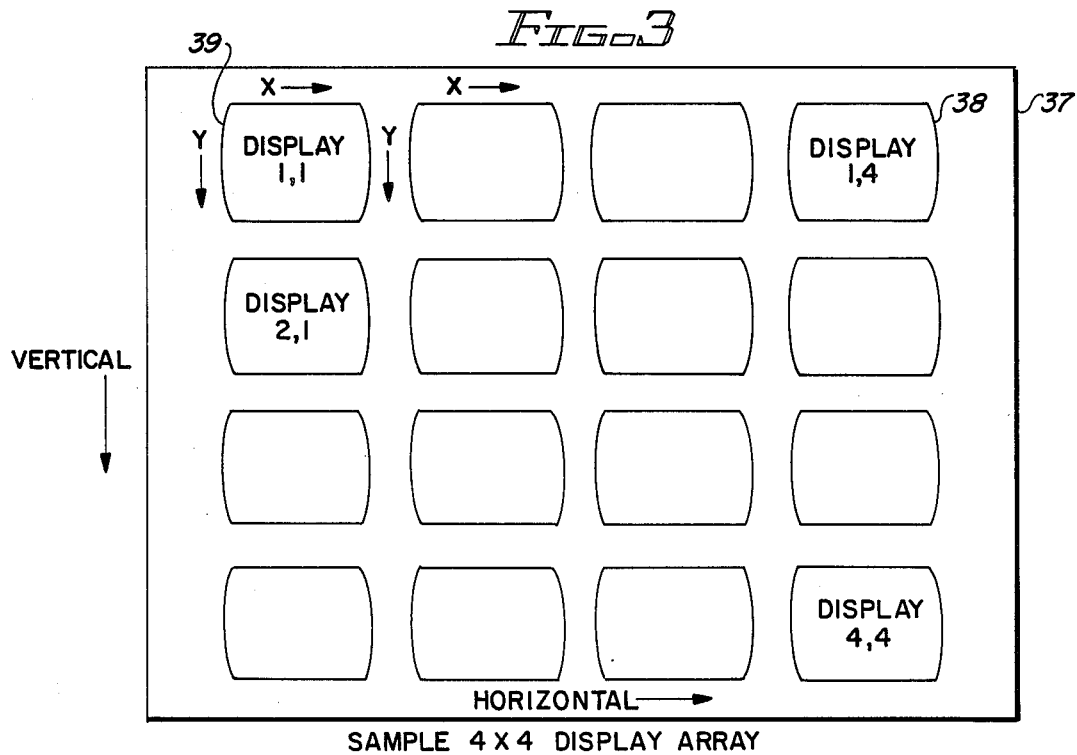
FIG. 3 is a sample four by four display array.

FIG. 3 shows an example of an array 37 of display monitors 38 arranged along X and Y axes. This example array 37 contains sixteen monitors with each monitor identified with a pair of coordinate numbers that represent their relative position on the horizontal "X" and the vertical "Y" axes of the array. For instance, the upper left hand corner monitor 39 is Display 1,1.

Figure 4:
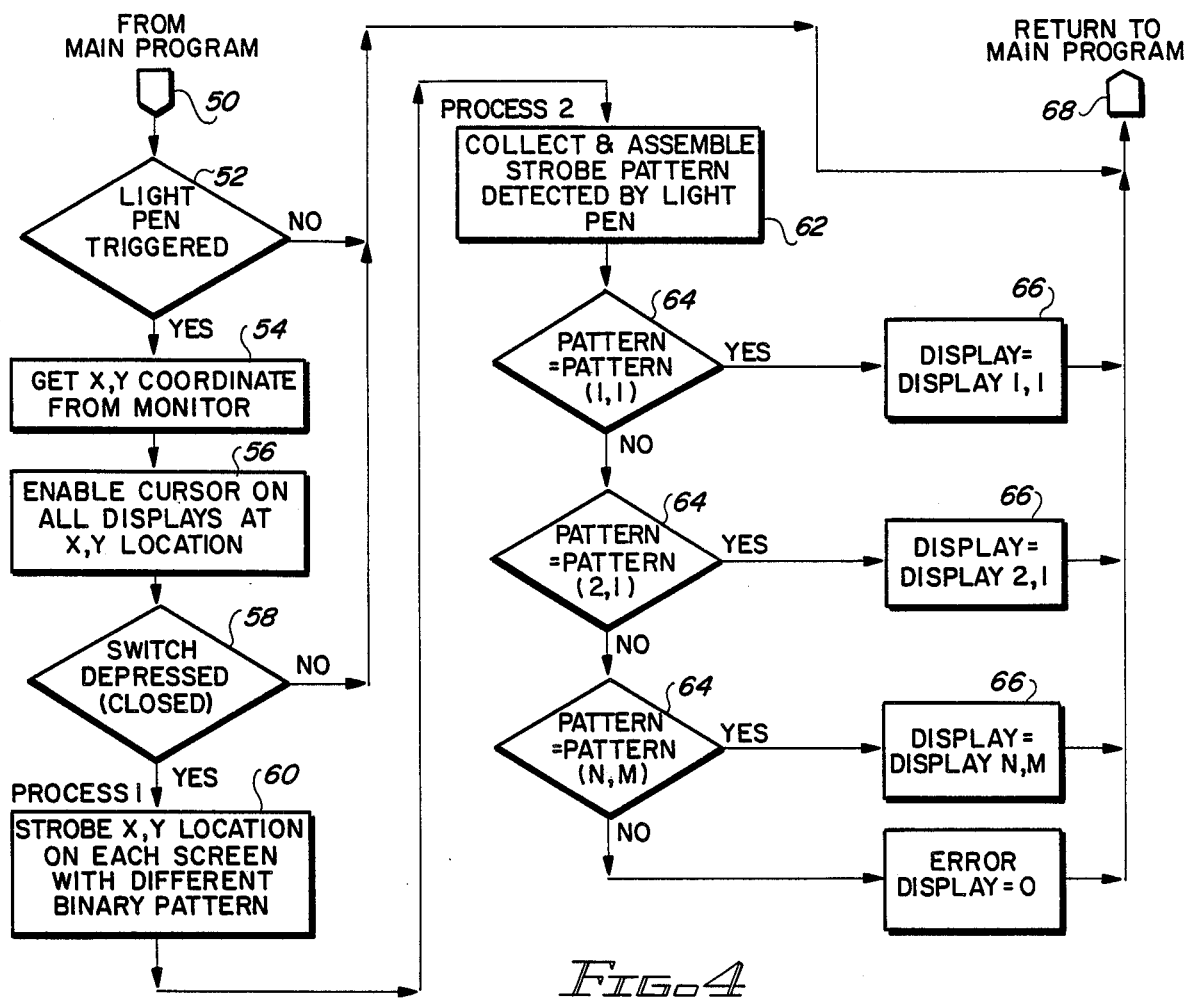
FIG. 4 is a flow diagram of the computer software for initializing the integration of the system of FIGS. 1 and 2.

The operation of the system can be seen in the flow diagram of FIG. 4 which is a flow diagram of a logical process that would be implemented in software or firmware or hardware and that would work in conjunction with the hardware arrangement as defined in connection with FIGS. 1 and 2. This flow diagram details logic used to sense on which monitor of the array of monitors, such as shown in FIG. 3, the operator intends the light pen to operate. That is, to determine which of the array's monitors the light pen is being pointed to and, concomitantly, the location on that particular monitor's screen where the light pen is positioned.

Following the flow diagram in FIG. 4, the process is entered when called from or branched to from a main program 50. A logical test 52 is made to determine the state of the light pen. If the light pen is triggered, that is a strobe of the horizontal sweep synchronized through line 20 of FIG. 2 is detected, then the X and Y coordinates of the location of the light pen on the display screen are calculated at 54 from the known rate of horizontal sweep and the elapsed time from the initiation of the sweep and the triggering of the light pen. The cursors of all the monitors of the array are then enabled at 56 and located at this X and Y coordinate position on the screens. The enabling of the cursor at this location provides feedback to the operator as to where the light pen is aimed, and as the operator moves the light pen in front of any monitor, the enabled cursor "follows" the light pen.

If at any time the light pen tip is pressed at 58 against the face of any monitor so as to depress its tip sufficiently to close the light pen switch contained therein, then at that X and Y location a pattern 60 of on and off strobing is effected by the phosphors in the vicinity of those X and Y locations of the displays to become excited or not excited (on or off), while at the same time at 62 monitoring the pattern detected by the light pen. A different pattern of ON and OFF is sent to each of the monitors in the array in FIG. 3, so that sixteen different patterns are generated and propagated to the monitors, but the pattern detected by the light pen will match only the pattern propagated to the display device on which it is positioned.

The detected pattern is now logically compared to the patterns 64 known to have been propagated to each of the sixteen screens and when a match is made, then the display device 66 that corresponds to that pattern is known. The known screen and the location of the X and Y coordinate on that screen can now be returned to the main line or calling program 68 where the appropriate branching or action can be performed as intended by the operator.

The logic of this process is able to operate because of the unique arrangement of the hardware that provides synchronized horizontal strobes to all the monitors so that the X and Y positioning of the light pen is always calculated to yield the same relative position on all the monitors. This permits sending the strobing patterns so that each monitor can be uniquely identified.

Other logical processes might be flow charted to yield the same results given this hardware configuration. For example, a binary search of the monitors might be made to determine on which monitor the light pen has been positioned. In this process, the phosphors in the vicinity of the calculated X and Y location of half the displays would be turned on and off. If the light pen detected a pulse it would now be known to rest on one of only eight monitors (one half of the 16 monitors in the array). If no pulse was detected, it would rest on one of the eight retaining monitors. The appropriate set of eight monitors would then again be halved by sending a strobe (ON and Off) to four monitors of the set and so forth until the monitor on which the light pen was positioned was clearly known. The significance here is that the hardware arrangement and customization of the hardware to disable the internal vertical, horizontal, and subcarrier timing to allow external synchronization through interconnections to the synchronization generator card (Video Associates Labs) or other synchronization source is essential to the implementation of the operation of the essence of the invention. A variety of software implemented processes might be used in conjunction with the defined hardware arrangement.

Figure 5:
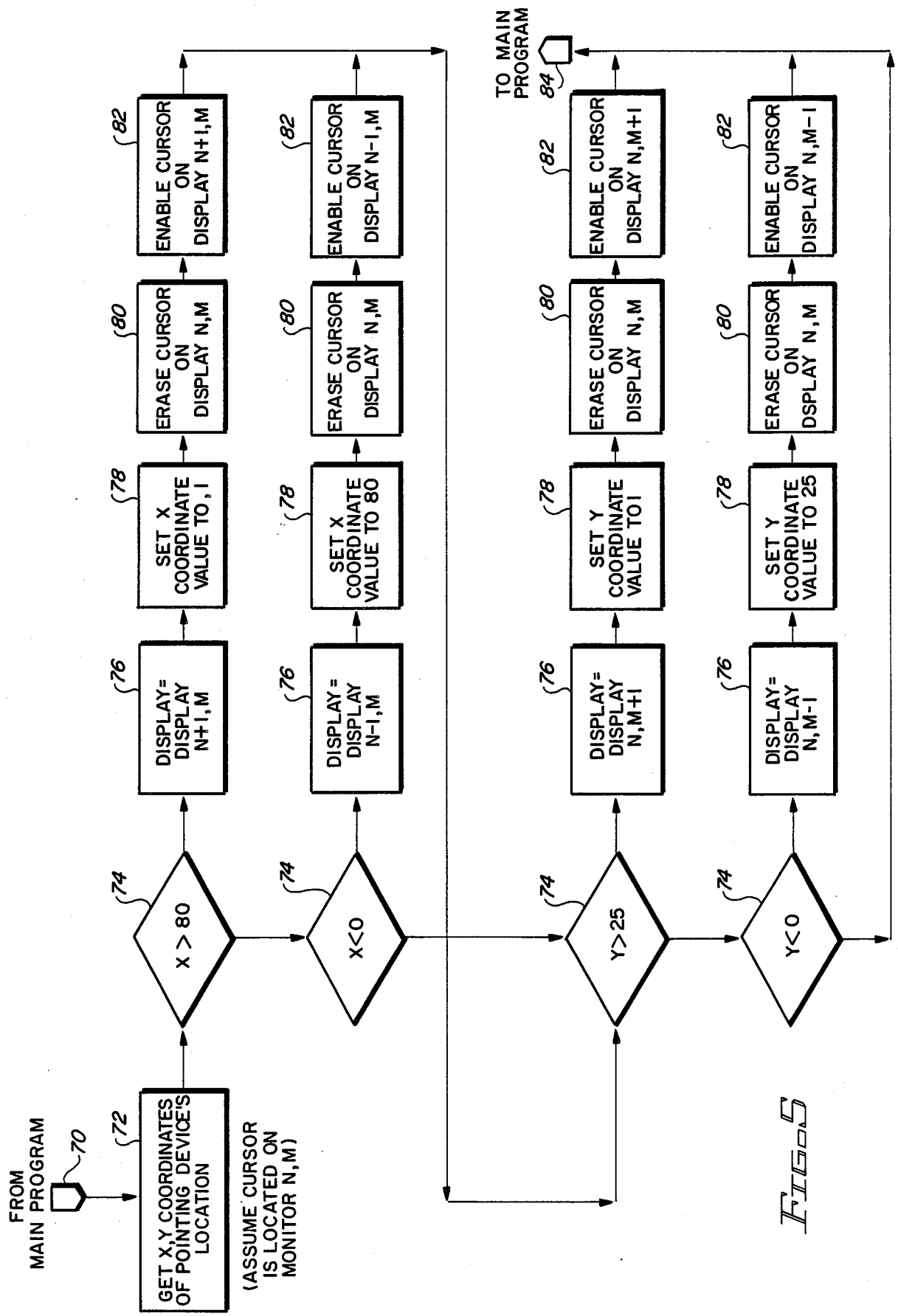
FIG. 5 is another flow diagram of the computer software for initializing the integration of the system of FIGS. 1 and 2 for using a pointing device other than a light pen.

Referring to FIG. 5, the concepts of the invention as explained thus far can be generalized from the use of a light pen to the use of other pointing or positioning input devices such as a computer mouse or track ball or joy stick.

The process is brought to bear when it is entered from a main or calling program or routine 70. Initially, the cursor is assumed to be on any monitor (N,M) of the array as shown in in the example 4×4 array of 16 monitors of FIG. 3. Assume any display in the array has an X coordinate resolution of 80 units and a Y coordinate resolution of 25 units. These resolution values are example only and might be higher or lower.

The logical location of the pointing device is then determined at 72. That is, what are its relative X and Y coordinate positions on that monitor. As the positioning device is moved so as to alter its X and Y coordinate value, these values are tested by the process of 74. If a value increases or decreases beyond the positioning resolution of the monitor (80 units on the X axis and 25 units on the Y axis in the illustrated embodiment), then: The active display is altered to the appropriate adjacent display 76 and the X or Y or both X and Y coordinate position values are set to the appropriate display boundary resolution limit(s) 78, (0 or 80 for the X axis and 0 or 25 for the Y axis). Accomplishing this requires the hardware counters of the pointing device be modified so that the position values contained in its registers can be set to a new value when a boundary limit is reached and a transition to a different display device is made. The cursor on the previously active screen is erased at 80, and the cursor on the newly active display is enabled at the new X and Y coordinate values 82.

These parameters are then returned to main or calling program 84. If in conjunction with this now known positioning, a switch on the input device has also been activated, then logic in that routine can branch to an appropriate responding action.

Through this sample process, it can be seen that multiple graphic displays or graphic overlays over video or other analog imagery may be addressed using a generalized pointing devices other than a light pen.

I claim:

1. A multiple display system comprising:

a microcomputer having a mother board having a plurality of expansion slots therein and connected to a keyboard;

a plurality of display cards attached to said mother board and being operatively attached to each other;

a plurality of displays, one display being attached to each display card for operation thereby:

a synchronization generator card attached to one slot of said mother board for synchronizing said plurality of display cards;

a pointer device attached to said microcomputer for actuating each of said plurality of displays;

means for recognizing which display said pointer device is being used upon and to operate a plurality of displays with the pointer on any one of said displays; and memory means for storing and retrieving analogue and digitized picture files and information and coordinate text on said stored analogue and digitized picture files, said memory means being coupled to said microcomputer having a plurality of display cards for displaying the stored analogue and coordinate digitized picture files and text.

2. A multiple display system in accordance with claim 1 in which each of said plurality of displays is a CRT monitor.

3. A multiple display system in accordance with claim 2 in which said pointer device attached to said multiple display system is a light pen.

4. A multiple display system in accordance with claim 1 in which said memory means includes a videodisc player connected to said synchronization generator card.

5. A multiple display system in accordance with claim 4 in which a disk controller is attached to said mother board and has an optical storage device attached thereto.

6. A multiple display system in accordance with claim 4 in which a disk controller is attached to said mother board and has an optical disk device attached thereto.

7. A multiple display system in accordance with claim 4 in which a disk controller is attached to said mother board and has a magnetic storage device attached thereto.

8. A multiple display system in accordance with claim 4 in which a disk controller is attached to said mother board and has a magnetic disk device attached thereto.

9. A multiple display system in accordance with claim 1 in which said pointer device includes a mouse interface card attached to said microcomputer mother board and having a mouse attached thereto.

10. A multiple display system in accordance with claim 6 in which a light pen is attached to said mother board.

11. A multiple display system in accordance with claim 7 in which a frame buffer and digitizer board is attached to said microcomputer mother board.

12. A multiple display system in accordance with claim 1 in which said plurality of display cards includes two display cards having one monitor connected to each display card.

* * * * *